US008806982B2

(12) United States Patent
Bohn et al.

(10) Patent No.: US 8,806,982 B2
(45) Date of Patent: Aug. 19, 2014

(54) HOLLOW DRILL AND A PRODUCTION PROCESS FOR THE SAME (75) Inventors: Klaus-Peter Bohn, Gams (CH); Zsolt Kosa, Kecskemet (HU); Roland Foser, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 477 days.

(21) Appl. No.: 13/098,945

(22) Filed: May 2, 2011

(65) Prior Publication Data
US 2011/0280678 A1 Nov. 17, 2011

(30) Foreign Application Priority Data

May 3, 2010 (DE) .......................... 10 2010 028 474

(51) Int. Cl.
B21K 5/04 (2006.01)
(52) U.S. Cl.
USPC ........................................................ 76/108.1
(58) Field of Classification Search
USPC .................... 76/108.1; 72/370.12, 370.14
See application file for complete search history.

(56) References Cited

U.S. PATENT DOCUMENTS

| 2,348,874 A * | 5/1944 | Andreasson ...................... 408/57 |
| 2,405,298 A * | 8/1946 | Fleischer ...................... 76/108.6 |
| 2,421,629 A * | 6/1947 | Langos ............................ 72/356 |
| 2,541,849 A * | 2/1951 | Villeneuve ................... 76/108.6 |
| 2,902,259 A * | 9/1959 | Tilden ............................ 175/400 |
| 2,935,906 A * | 5/1960 | Andreasson ...................... 408/59 |
| 3,010,345 A * | 11/1961 | Wagner ............................ 408/59 |
| 3,085,453 A * | 4/1963 | Mossberg ..................... 76/108.1 |
| 3,393,722 A * | 7/1968 | Windham ........................ 81/438 |
| 3,504,575 A * | 4/1970 | Makino et al. ............... 76/108.1 |
| 4,078,415 A * | 3/1978 | Koch et al. ....................... 72/356 |
| 4,212,459 A * | 7/1980 | Wolf .............................. 273/442 |
| 4,245,846 A * | 1/1981 | Andrews ...................... 279/46.3 |
| 4,485,655 A * | 12/1984 | Ewing ................................. 72/68 |
| 5,452,628 A * | 9/1995 | Montgomery et al. ...... 76/108.2 |
| 6,189,633 B1 | 2/2001 | Kleine et al. |
| 6,540,452 B1 * | 4/2003 | Bolkart et al. ................ 408/230 |
| 2003/0019269 A1 * | 1/2003 | Rolf ................................. 72/85 |
| 2004/0181926 A1 * | 9/2004 | Dion et al. ...................... 29/434 |

(Continued)

FOREIGN PATENT DOCUMENTS

AT 119291 B 10/1930
DE 672237 C 2/1939

(Continued)

OTHER PUBLICATIONS

EPO Communication dated Aug. 8, 2011 in Application No. 11162792.3-1262 (10 pages).

(Continued)

Primary Examiner — Hwei C Payer
(74) Attorney, Agent, or Firm — McAndrews, Held & Malloy, Ltd.

(57) ABSTRACT

A production process is provided for a drill including the following steps. From a rod-shaped blank comprising an end section, a central section, and a hollow space extending at least through the end section and the central section along an axis of the blank, the end section is formed in a direction extending radially relative to the axis, the diameter of the hollow space in the end section being reduced. Either a cutting element is attached to the end section or grooves are introduced into the end section for forming a shank.

12 Claims, 5 Drawing Sheets

(56) References Cited

U.S. PATENT DOCUMENTS

| | | | |
|---|---|---|---|
| 2005/0268748 A1* | 12/2005 | Koecher | 76/108.1 |
| 2011/0280678 A1* | 11/2011 | Bohn et al. | 408/204 |
| 2012/0285749 A1* | 11/2012 | Bohn et al. | 175/393 |
| 2013/0136550 A1* | 5/2013 | Kakai et al. | 408/59 |

FOREIGN PATENT DOCUMENTS

| | | |
|---|---|---|
| DE | 970565 C | 10/1958 |
| DE | 19725453 A1 | 2/1998 |
| DE | 19856986 A1 | 7/1999 |
| DE | 10005578 A1 | 8/2000 |
| DE | 10129671 A1 | 1/2003 |
| DE | 10337929 A1 | 3/2005 |
| DE | 102007053551 A1 | 5/2009 |
| EP | 0374276 A1 | 6/1990 |
| EP | 0941793 A2 | 9/1999 |

OTHER PUBLICATIONS

DE Communication, Mar. 2, 2011, 5 pages.

\* cited by examiner

HOLLOW DRILL AND A PRODUCTION PROCESS FOR THE SAME

RELATED APPLICATIONS

The present application claims priority to German Patent Application DE 102010028474.2, filed May 3, 2010, and entitled "Hollow Drill and a Production Process for the Same" the entire content of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to hollow drills and production processes for hollow drills.

BRIEF SUMMARY OF THE INVENTION

In certain embodiments the production process for a hollow drill of the invention has the following steps. From a rod-shaped blank comprising an end section, a central section, and a hollow space extending at least through the end section and the central section along an axis of the blank, the end section is formed in a direction extending radially relative to the axis, the diameter of the hollow space in the end section being reduced. Either a cutting element is attached to the end section or grooves are introduced into the end section for forming a shank.

From a rod-shaped blank in one embodiment comprising a first end section, a second end section, a central section disposed between the first end section and the second end section, and a hollow space extending along an axis of the rod-shaped blank, the first end section and the second end section are formed in a direction extending radially relative to the axis, the diameter of the hollow space in the first and the second end sections being reduced. A cutting element is attached to the formed, first end section. The formed section end section is provided with grooves for a shank.

In certain embodiments, the diameter of the hollow space in the first end section can be reduced to less than 10% of the diameter in the central section. The hollow space can also be closed completely. In doing so, the end section is compressed to such an extent that the hollow space is removed preferably over the entire axial length of the end section. The end section can be formed in a direction extending transversely to the axis such that it has a cross-shaped outer contour.

In one embodiment, the hollow space is drilled into the rod-shaped blank. Furthermore, a tube that is extruded, drawn or produced otherwise can also be used as the rod-shaped blank.

In another embodiment, the rod-shaped blank is formed along the axis, the outer diameter of the end section being increased relative to an outer diameter of the central section. A compression of the blank causes the wall of the end section to thicken. The material derived from the longitudinal compression can be used for filling out the hollow space during the faulting process, e.g. squeezing process, in a direction extending radially relative to the axis.

A hollow drill of one embodiment of the invention comprises a shaft, a base, a cutting element, and a shank. The shaft has a hollow space extending along an axis. A cutting element is attached to the base by means of a joining process. The base is joined to the shaft, preferably without any joining zones. A seam extending along the axis is enclosed within the base. The seam does not extend up to the circumferential edge of the base. The base comprises folded edges extending along the axis. The folded edges increase the rigidity of the base in the axial direction, as a result of which the chiseling action of the drill can be improved.

The base can also have a circular cross-section and, depending on the diameter of the drill, the same diameter as that of the subsequent shaft.

Additional advantages and advantageous embodiments of the subject of the invention are demonstrated in the description, in the drawings, and in the claims. Likewise, the features named above as well as those further explained below can be incorporated according to embodiments of the present invention either alone or in any number of combinations. The embodiments illustrated and described here should not be understood as an exhaustive and exclusive listing, but rather offer particular examples for the purpose of explaining the invention.

BRIEF DESCRIPTION OF THE FIGURES

The invention is explained in the following description with reference to exemplary embodiments and figures, in which.

Components that are identical or have similar functions are denoted by the same reference numerals in the figures unless specified otherwise.

DETAILED DESCRIPTION OF THE INVENTION

Figure 1:
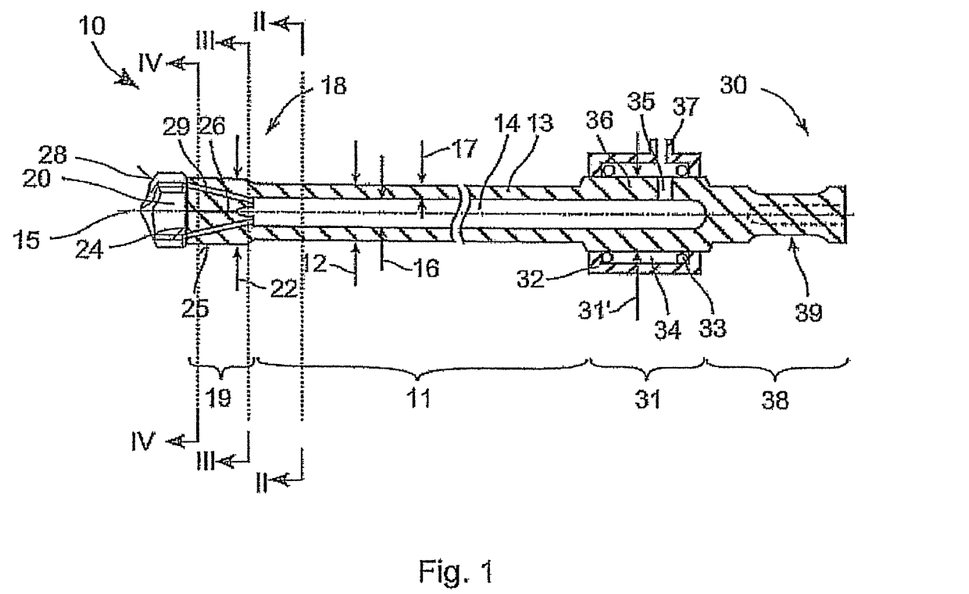
FIG. 1 shows a longitudinal section of a drill formed in accordance with an embodiment of the present invention, by way of example.
Figure 2:
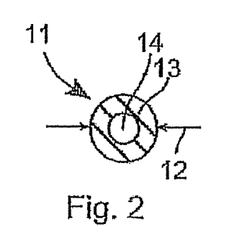
FIG. 2 shows a cross-section of the drill shown in FIG. 1 taken along plane II-II.

FIG. 1 shows a longitudinal section of a hollow drill 10 formed in accordance with an embodiment of the present invention, by way of example. FIG. 2 shows a cross-section of the hollow drill 10 of FIG. 1 taken along the plane II-II, FIG.

Figure 3:
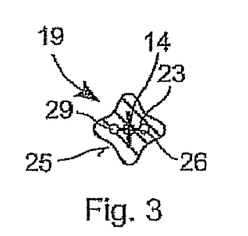
FIG. 3 shows a cross-section of the drill shown in FIG. 1 taken along plane III-III.
Figure 4:
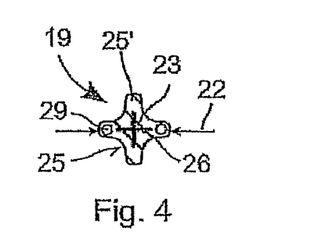
FIG. 4 shows a cross-section of the drill shown in FIG. 1 taken along plane IV-IV.

3 shows a cross-section taken along the plane and FIG. 4 shows a cross-section taken along the plane IV-IV shown in FIG. 1.

A hollow shaft 11 of the hollow drill 10 is preferably cylindrical in shape with a constant outer diameter 12. A wall 13 of the shaft 11 surrounds a hollow space 14 extending along an axis 15 of the hollow drill 10. A diameter 16 of the hollow space 14 may be approximately in the range of 20% to 80% of the outer diameter 12 of the shaft 11. The wall 13 preferably has a constant thickness 17 over the entire axial length of the shaft 11, and preferably has no radial openings.

At a front axial end 18, the shaft 11 merges into a base 19 for a cutting element 20. The base 19 and the shaft 11 are constructed monolithically from a blank and joined together without any intermediate joining zone. The maximum radial dimension 22 of the base 19 can be larger than the diameter 12 of the shaft 11. The diameter 16 or a cross-sectional surface extending at right angles to the axis 15 of the hollow space 14 reduces continuously in the base 19 along the axis 15. Preferably, the hollow space 14 is closed by the base 19 in the axial direction. In alternative embodiments, the cross-sectional surface of the hollow space 14 may reduce, e.g. to less than 1% of the cross-sectional surface of the base 19 or less than 10% of the cross-sectional surface of the hollow space 14 in the region of the shaft 11.

In certain embodiments, cross-section 23 of the base 19 is circular or cross-shaped, or it may have any other cross-section corresponding to the number of cutting edges, and it merges from a circular cross-section in the region disposed close to the shaft 11 into a cross-shaped cross-section at the end surface 24. FIGS. 3 and 4 show two cross-sections of the base 19 taken along different planes and IV-IV respectively along the axis 15.

The base 19 has a closed outer contour 25 comprising no joining zones. Inside this closed contour 25, the base 19 comprises one or more radially extending seams 26. The seams 26 are preferably located in a plane defined by the axis 15 and a radial direction. The material of the base 19 is bent around folded edges 25' that form the radial outer ends of the contour 25. In the region of the seams 26, the material of mutually opposing surfaces can come into contact with each other, but without forming an integral material bond. Openings located in the region of the seams 26, more particularly openings extending along the axis 15 have a dimension of preferably less than 0.5 mm at right angles to the axis 15.

On the end surface 24 of the base 19, the cutting element 20, e.g. a monolithic drill head made of hard metal and comprising three or four cutting edges 28 is attached, or a cutting plate made of hard metal and comprising two or more cutting edges is attached in a slot in the base. The cutting element 20 leaves open regions of the end surface 24. Channels 29 extend from these open regions of the end surface 24 through the base 19 to the hollow space 14. Preferably, an opening of the channels 29 is disposed on an outer edge of the end surface 24. The channels 29 can extend at an inclination relative to the axis 15. Drill dust from the drilled hole can be drawn into the hollow space 14 by way of these channels 29 or a rinsing fluid from the hollow space 14 can be injected into the drilled hole. The channels 29 may have a diameter of 5% to 25% of the diameter of the base 19, e.g. 1 to 8 mm.

At another axial end 30, the shaft 11 merges into a connecting piece 31 for a sleeve 32 for purposes of suction or injection. Preferably, the shaft 11 and the connecting piece 31 are joined together monolithically, that is, without any joining zones. The connecting piece has a cylindrical shape, the outer diameter 31' of which can be larger than the shaft 11. The hollow space 14 extends axially from the shaft 11 into the connecting piece 31 substantially without an alteration in its diameter 16. Preferably, the hollow space 14 ends inside the connecting piece 31 and is delimited in the axial direction.

The sleeve 32 is slid on the connecting piece 31, which sleeve can rotate relative to the drill 10. Sealing elements 33 seal an annular suction chamber 34 disposed between the sleeve 32 and the connecting piece 31 in a liquid-tight and/or dust-tight manner. The suction chamber 34 is connected to the hollow space 14 by means of a connecting channel 35. The connecting channel 35 extends radially, e.g. at right angles or at an inclination to the axis 15, through a wall 36 in the connecting piece 31. Drill dust from the hollow space can be extracted by suction or a fluid can be injected into the hollow space 14 by means of the connecting channel 35. The sleeve 32 comprises a flange 37 for connection to a pump or blower installation.

A shank 38 of the drill 10 adjoins the connecting piece 31 in the axial direction. The shank 38 can comprise one or more axially open and/or axially closed grooves 39 for locking the drill 10 in a tool holder and for enabling the drill 10 to co-rotate with the tool holder.

A production process for the drill 10 is explained with reference to FIGS. 5 to 8 by way of example. The starting point of the production process is a solid cylindrical blank 40. The cylindrical blank 40 is formed in such a way that a front end section 41 of the blank 40 for the base 19 has a larger diameter than a central section 42 of the blank 40 for the shaft 11. A rear end section 43 of the blank 40 is preferably adapted to match the typical cross-sections of tool holders available on the market. Between the rear end section 43 and the central section 42, an additional section 44 for the connecting piece 31 can be formed such that it has a diameter that is larger than that of the central section 42. The central section 42, the rear end section 43 and the additional section 44 preferably have a cylindrical outer contour. The front end section 41 can be fowled with a cylindrical or a truncated-conical outer contour.

Figure 5:
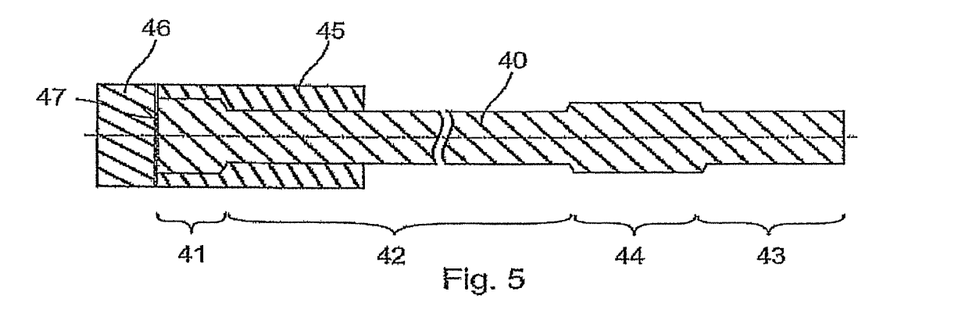
FIGS. 5 to 8 show longitudinal sections of a blank during a production process in accordance with an embodiment of the present invention for the drill shown in FIG. 1 by way of example.
Figure 6:
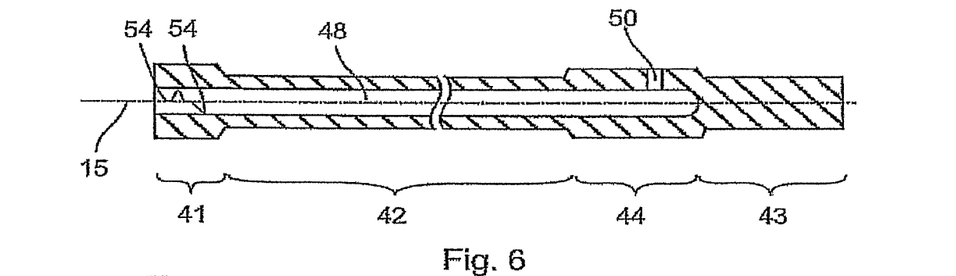

A step in the forming process for the front end section 41 is shown in FIG. 5 by way of example. A tool form 45 circumferentially encloses the front end section 41 of the cylindrical blank 40 and at least one adjoining part of the central section 42. Between the tool form 45 and the front end section 41, there is defined an annular intermediate space, and the tool form 45 bears flush against the central section 42. A punch 46 compresses the blank 40 axially in that the punch 46 presses an end surface 47 of the cylindrical blank 40. The material punched out is pushed into the intermediate space. The punched blank 40 consequently fills out the annular intermediate space, as illustrated.

An alternative step in the forming process starts with a cylindrical blank 40, the outer diameter of which corresponds to the outer diameter of the front end section 41. A diameter in the region of the central section 42 is reduced to the desired dimension by means of cylindrical-die rolling. The diameter of the rear end section and the additional section can be configured similarly in accordance with the steps of the forming process described.

Alternatively, the different diameters of the individual sections can be realized by means of metal-cutting processes such as turning or milling.

A hollow space 48, e.g. in the form of a blind hole starting from the end surface 47 of the front end section 41, is drilled along an axis 15 of the blank 40 (FIG. 6) into the formed or milled blank 40. The hollow space 48 extends through the front end section 41 and the central section 42 and into the additional section 44. A bore 50 extending radially up to the hollow space 48 is drilled into the additional section 44 of the blank 40.

Figure 7:
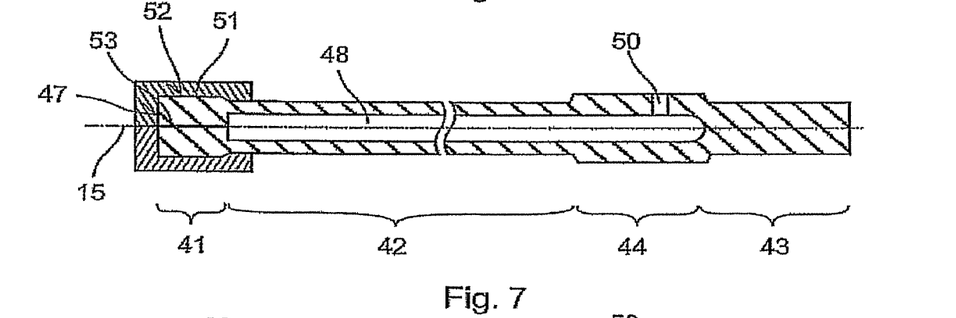
Figure 8:
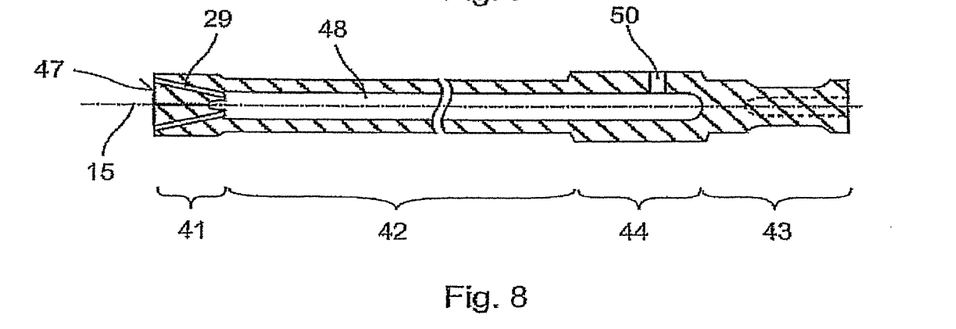

In the front end section 41, the hollow space 48 is reduced by a aiming process in the radial direction in order to form the base 19 (FIG. 7). A multi-part press 51 or a forging tool squeezes the circumferential surface 52 of the front end section 41 in the radial direction. The hollow space 48 in the front end section consequently has a maximum diameter amounting to 10% of the diameter in the central section 42. Preferably, the hollow space 48 is closed, i.e. the hollow space 48 is preferably completely filled out by the material formed. The base 19 can have a cross-shaped cross-section due to the forming process carried out in the radial direction. A seam 53 can be made along the axis 15 out of the previously mutually opposing inner walls 54 of the front end section 41 that is drilled out. The forming process can be carried out without or with the application of heat, e.g. by means of a red-hot blank 40.

A cylindrical or conical pin made of steel can also be inserted into the front end section 41 prior to the radial forming process. The pin preferably has the length of the front end section 41. The diameter of the pin can be smaller than the diameter of the hollow space 48.

Channels 29 are drilled (FIG. 8) into the base 19. The drill head 20 or any other cutting element is then attached to the end surface 47 of the base 19 (FIG. 1). For this purpose, an indentation can be made in the end surface, and the cutting element can be inserted into the indentation. Grooves 39 for the shank 38 are formed on the rear end section 43. The sleeve 32 is slid over the radial bore 50.

Figure 9:
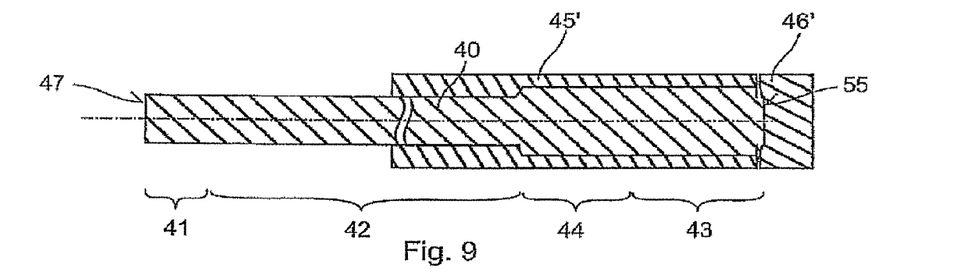
FIGS. 9 to 12 show longitudinal sections of a blank during a production process in accordance with another embodiment of the present invention for the drill shown in FIG. 1 by way of example.

In an alternative embodiment, the diameter of the rear end section 43 is increased by means of a compression process (FIG. 9). A forming tool 45' encloses the rear end section 43 and preferably a part of the central section 42. The forming tool 45' has a larger inner diameter in the region of the rear end section 43, and it does not bear against the initial blank 40. During the compression process, the material displaced by a punch 46' is pressed radially into the gap between the forming tool 45' and the blank. The rear end section 43 is shorter and thicker.

Figure 10:
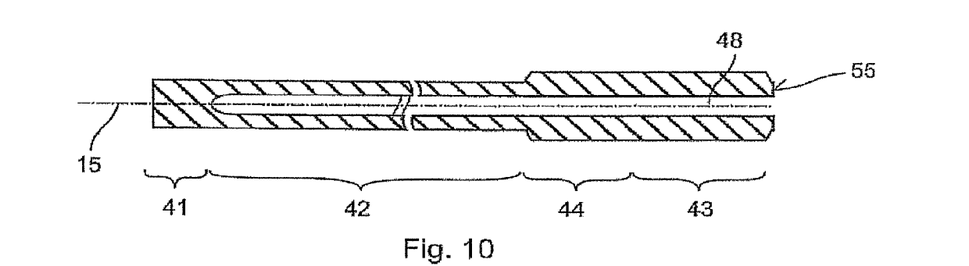
Figure 11:
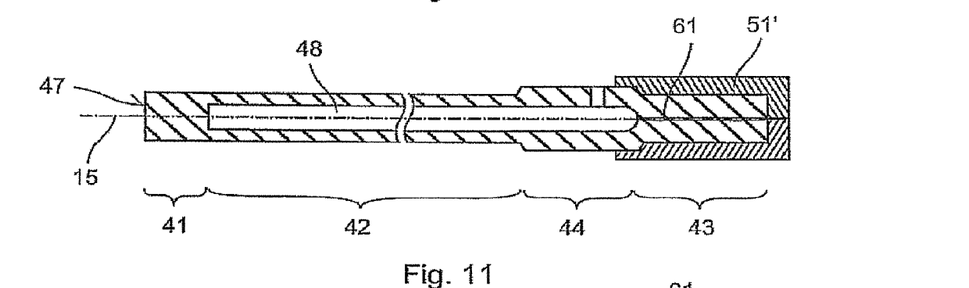
Figure 12:
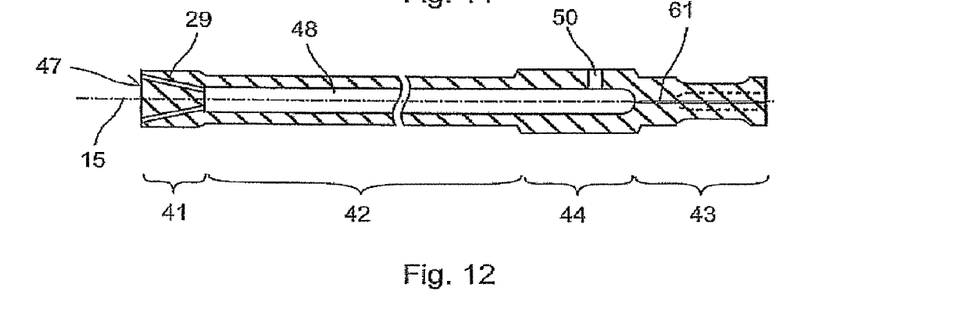

Starting from the end surface 55 of the rear end section 43, a blind hole 48 is drilled into the blank 40. The blind hole 48 ends before the front section 41 (FIG. 10). The rear end section 43 is squeezed in the radial direction until the hollow space formed by the blind hole is closed, that is, removed (FIG. 11) preferably along the entire rear section 43 for the shank. In the rear end section 43, there remains an axially extending seam 61. The squeezing process can be carried out by means of a forming tool 51'. The blank thus formed can be provided with channels, the suction channel, the cutting element, and the grooves, as described above (FIG. 12).

Figure 13:
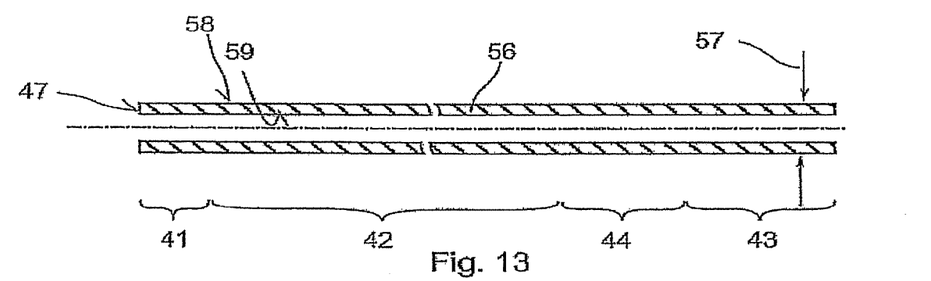
FIGS. 13 to 16 show longitudinal sections of a blank during a production process in accordance with another alternative embodiment of the present invention for the drill shown in FIG. 1 by way of example.

In an alternative embodiment, a tubular blank 56 is formed into the drill 10 (FIG. 13). The blank 56 is preferably based on a hollow rod profile having a uniform cross-section 57 over its entire length. The cross-section 57 is annular in shape and comprises a preferably circular or oval outer contour 58 and a similarly shaped inner contour 59.

Figure 14:
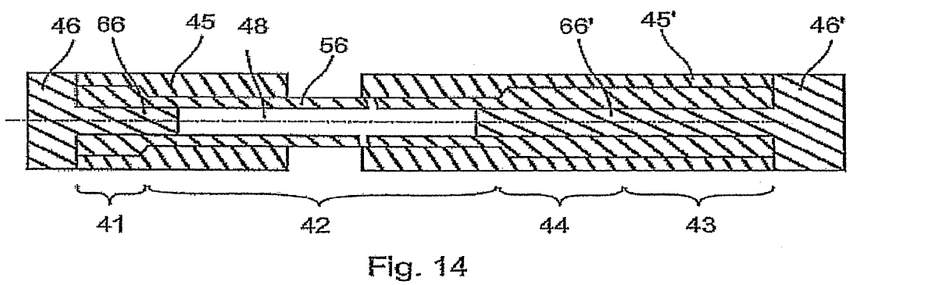

A front end section 41 of the blank 56 is compressed in order to locally increase the outer diameter (FIG. 14). A forming tool 45 used defines an annular intermediate space around the front end section 41 and is flush with a central section 42. A spigot 66 (a spigot 66' may be used on the other end) can be pushed into the hollow space 48 of the blank 56, more particularly into the front end section 41. The spigot 66 preferably bears completely against the inner wall of the hollow space 48. A punch 46 compresses the blank 56 along the axis. Likewise, a rear end section 43 is preferably compressed along the axis. The spigot 66 is removed.

Figure 15:
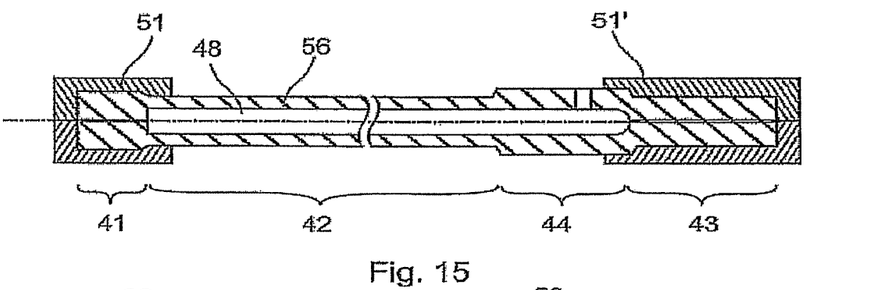
Figure 16:
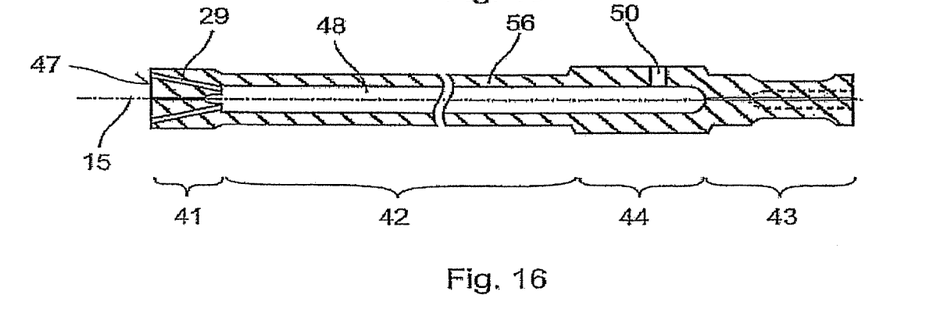
Figure 17:
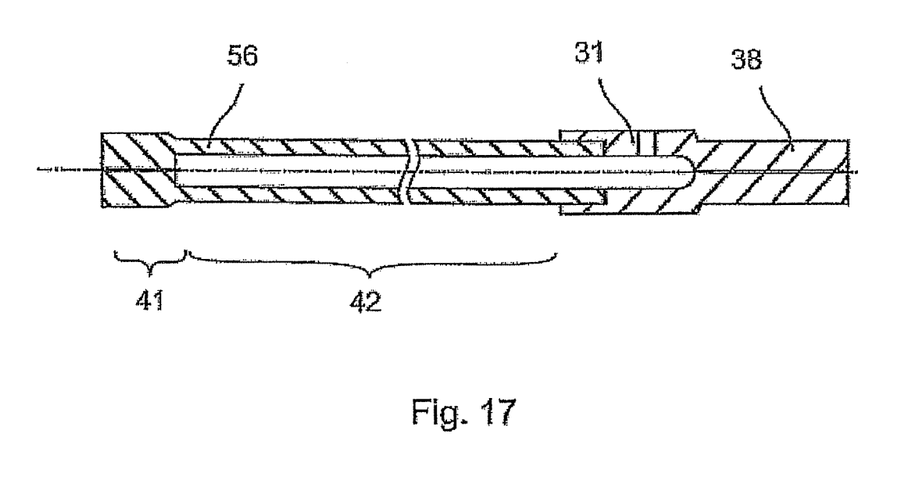
FIG. 17 shows a longitudinal section of a blank during a production process in accordance with an embodiment of the present invention for the drill shown in FIG. 1 by way of example.

The entire front end section 41 is now squeezed by a tool 51, (51' may be used for the other end) in the radial direction, as a result of which the hollow space 48 in the front end section 41 is reduced and preferably closed in the direction of the base (FIG. 15). The rear end section 43 is squeezed radially for the shank, the hollow space 48 being closed in the direction of the shank. The blank 56 formed in this way can be provided with channels, the suction channel, the cutting element, and the grooves, as described above (FIG. 16).

In a further embodiment, the hollow space 48 of the drill 10 is composed of two joined pieces. A first piece is formed by the tubular blank 56, the front end section 41 of which is compressed in the axial direction and then squeezed in the radial direction. The second piece comprises the connecting piece 31 and the shank 38. The connecting piece 31 is shaped like a sleeve and it comprises an opening for receiving the rear end section 43 of the blank 56. The two pieces can be joined together positively, non-positively and/or by means of an integral material bond.

The invention claimed is:

1. A method for producing a drill, the method comprising:
providing a rod-shaped blank having a first end section and a second end section, a central section disposed between the first and second end sections, and a hollow space, the hollow space extending at least through the central section and one of the first and second end sections along an axis of the rod-shaped blank, processing the rod-shaped blank so that the first end section has an enlarged outer diameter relative to the outer diameter of the central;
forming the enlarged first end section in a direction extending radially relative to the axis of the rod-shaped blank, wherein a diameter of the hollow space in the first end section is reduced; and
attaching a cutting element to the first end section.

2. The method of claim 1, wherein the cross-section of the hollow space in the first end section is reduced to less than about 10% of the cross-section in the central section.

3. The method of claim 1, including forming the first end section in a direction extending transversely to the axis to form a contour deviating from a circumference of the blank and having a number of indentations corresponding to the number of cutting edges of the cutting element.

4. The method of claim 1, wherein the hollow space is formed by drilling into the rod-shaped blank.

5. A method for producing a drill, the method comprising:
providing a rod-shaped blank having a first end section and a second end section, a central section disposed between the first and second end sections, and a hollow space, the hollow space extending at least through the central section and one of the first and second end sections along an axis of the rod-shaped blank:
compressing the blank along the axis, whereby the outer diameter of the first end section is increased relative to the outer diameter of the central section;
forming the first end section in a direction extending radially relative to the axis of the rod-shaped blank, wherein a diameter of the hollow space in the first end section is reduced; and
attaching a cutting element to the first end section.

6. A method for producing a drill, the method comprising:
providing a rod-shaped blank having a first end section, a second end section, a central section disposed between the first and second end sections;
processing the blank so that at least one of the first and second end sections has an enlarged diameter relative to the central section;

providing a hollow space in the blank, the hollow space extending along an axis of the blank at least through the central section and the enlarged diameter end section; and forming the enlarged diameter end section in a direction extending radially relative to the axis of the rod-shaped blank, wherein a diameter of the hollow space in the enlarged diameter end section is reduced.

7. The method of claim 6, wherein the cross-section of the hollow space in at least one of the first and second end sections is reduced to less than about 10% of the cross-section in the central section.

8. The method of claim 6, wherein the hollow space is formed by drilling into the rod-shaped blank.

9. The method of claim 6, including compressing the blank along the axis, whereby the outer diameter of at least one of the first and second end sections is increased relative to the outer diameter of the central section.

10. The method of claim 6, comprising forming the second end section in a direction extending radially relative to the axis and forming grooves for a shank in the second end section.

11. The method of claim 6, comprising forming the first end section in a direction extending radially relative to the axis of the rod-shaped blank and attaching a cutting element to the first end section.

12. The method of claim 11, including forming the first end section in a direction extending transversely to the axis to form a contour deviating from a circumference of the blank and having a number of indentations corresponding to the number of cutting edges of the cutting element.

* * * * *